United States Patent [19]

Michaelis

[11] 3,961,118

[45] June 1, 1976

[54] SIMULATED WOOD PANEL

[75] Inventor: David E. Michaelis, Warminster, Pa.

[73] Assignee: Plastics Development Corporation of America, Philadelphia, Pa.

[22] Filed: May 7, 1975

[21] Appl. No.: 575,330

Related U.S. Application Data

[62] Division of Ser. No. 291,100, Sept. 21, 1972, Pat. No. 3,896,199.

[52] U.S. Cl. .................................. 428/151; 156/79; 428/158; 428/163; 428/188; 428/320
[51] Int. Cl.² ......................... B32B 3/00; B32B 3/20
[58] Field of Search ........... 428/151, 158, 160, 163, 428/188, 320; 156/78, 79, 293; 264/45.1, 54, 261, 263, 271, 267, 46.5

[56] References Cited
UNITED STATES PATENTS 3,523,989   8/1970   Murer .................................. 264/54
3,791,912   2/1974   Allard ................................. 428/213

Primary Examiner—William J. Van Balen
Assistant Examiner—P. J. Thibodeau
Attorney, Agent, or Firm—Seidel, Gonda & Goldhammer

[57] ABSTRACT

A simulated wood panel comprising a substrate with rigid elongated reinforcing members and foamed polymer coating which is molded to simulate the appearance of wood grain. The method for making the simulated wood panel comprises the steps of providing a substrate, providing elongated reinforcing means for said substrate, and covering said substrate and said reinforcing means with a foamed polymer.

7 Claims, 4 Drawing Figures

SIMULATED WOOD PANEL

This application is a division of copending application Ser. No. 291,100, filed Sept. 21, 1972, and now U.S. Pat. No. 3,896,119, entitled SIMULATED WOOD PANEL AND METHOD FOR MAKING THE SAME.

This invention relates to simulated wood products, and more particularly to a simulated wood panel and a method for making the same.

Simulated wood panels for use as paneling, doors, drawer fronts, shelving, picture and mirror frames, and the like are well known. Typically, the simulated panels are made using a core or substrate of flake-board, masonite, cardboard or the like. A foamed polymer is molded to a desired configuration over the substrate. Typically, the resultant configuration includes a simulated wood grain and ornamental designs.

This technique has been generally successful in that the panels formed thereby are relatively inexpensive and they are relatively easy to make.

However, simulated wood panels made in accordance with this procedure tend to absorb water to the extent that the fibers therein increase in volume and distortion results. Moreover, panels made in accordance with this method are rarely balanced in that there is not the same amount of foamed polymer along all portions of the substrate. Due to the fact that the amount of foamed polymer is not equal on both sides of the substrate with, in many cases, there being no foamed polymer on one side of the substrate, there is absorption of water into the substrate from the atmosphere. This leads to warpage of the panel due to the uneven expansion of the substrate in one direction.

It is particularly desirable to use flake-board, Masonite or cardboard for the core since these materials are substantially less expensive than the foamed polymer. Thus, the panels are made with a relatively thin coating of foamed polymer. The substrate comprises a substantial portion of the volume of the panel.

This invention has as an object the provision of a method for making a simulated wood panel which has a fibrous skeletal core and a foamed plastic outer surface, and which resists warpage and has great structural strength.

This invention has as another object the provision of a simulated wood panel having a fibrous skeletal core or substrate, a foamed plastic outer surface, and which resists warpage and has great structural strength.

Other objects will appear hereinafter.

In the method of the present invention, the simulated wood panel is prepared by providing a skeletal substrate, said substrate being formed of a water absorbing fibrous material such as flake-board, Masonite, cardboard, or the like, which absorbs water, providing at least one elongated groove in one of the surfaces of said skeletal substrate, inserting a rigid tubular reinforced means within said groove, preferably adhesively securing said rigid tubular reinforcing means within said groove, providing a foamed polymer, preferably a thermoset such as polyurethane or polyester on at least the surface of said groove which receives the rigid tubular reinforcing means, with the outer surface of said foamed polymer simulating wood grain, and sealing said simulated wood panel against the action of moisture.

The simulated wood panel of the present invention comprises the skeletal substrate formed of water absorbing fibrous material such as flake-board, Masonite, cardboard or the like, at least one groove in one face of said substrate, rigid tubular reinforcing means disposed within said groove, a foamed polymer, such as a thermoset foam polymer above said face of said substrate, with the outermost surface of said foamed polymer simulating wood grain, and with said panel being sealed against the action of moisture.

For the purpose of illustrating the invention, there is shown in the drawings a form which is presently preferred; it being understood, however, that this invention is not limited to the precise arrangements and instrumentalities shown.

Figure 1:
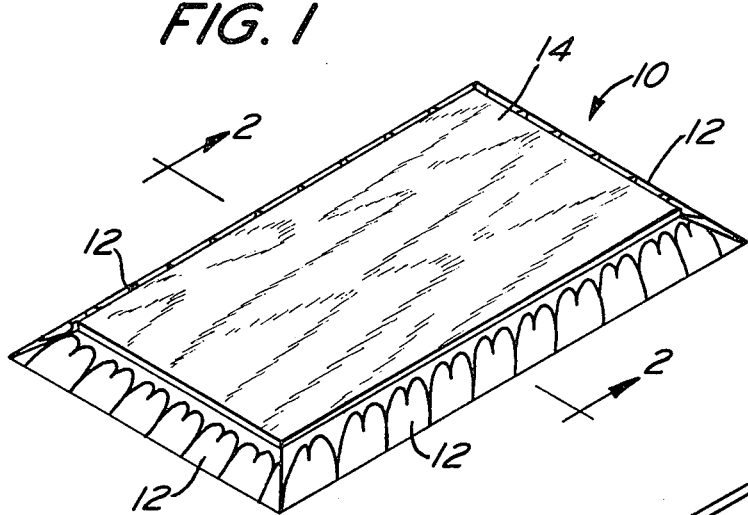
FIG. 1 is a perspective view showing a finished panel.

Referring now to the drawings in detail, wherein like numerals indicate like elements throughout the several views, there is seen in FIG. 1 a simulated wood panel 10. For the purposes of illustrating the invention, the panel is shown to be a shelf having a plurality of beveled edges 12 with ornamentation thereon. The surface 14 which is normally exposed to view has a simulated wood grain molded therein.

Figure 2:
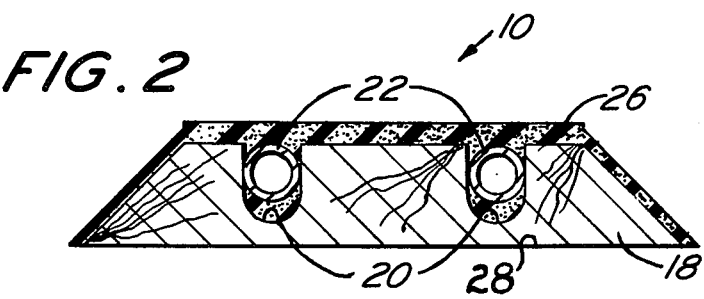
FIG. 2 is a sectional view taken along line 2—2 of FIG. 1.

Referring to FIG. 2 the simulated wood panel has a core or substrate 18. The substrate is made of any convenient inexpensive fibrous material that has sufficient strength for the purpose which the panel is to be made. Typically, the substrate may be made from Masonite, flake-board or cardboard. Masonite is a trademark for "any of various fiberboards made from steam exploded wood fiber and used variously (as for insulation and for paneling)." See Webster's Third New International Dictionary of the English Language, Unabridged (1961). Such fibrous materials have good structural strength properties, and are of lower cost than foaming polymeric materials. However, such fibrous materials tend to absorb water and in doing so lead to warpage problems. The substrate is cut or shaped to generally approximate the configuration of the finished simulated panel.

In order to increase the rigidity of the substrate and thereby promote the rigidity and uniformity of the finished panel, reinforcing means are provided.

Figure 3:
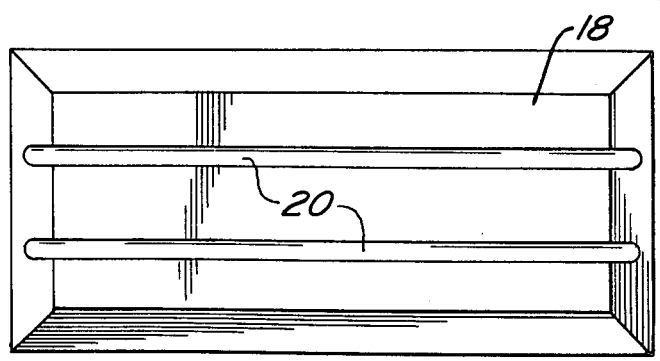
FIG. 3 is a plan view of a partially completed panel.

To this extent recesses 20, which may have rounded or square bottoms as is convenient, are formed on one of the surfaces of the substrate. As best seen in FIG. 3, the recesses 20 extend the entire length of the substrate thereby reinforcing the finished panel along its entire length. The recesses may be formed in any convenient manner. It should be noted that while two such recesses are illustrated in the drawing, it is apparent that as many recesses as are necessary can be formed. Thus, if a panel is to be of limited width, it is apparent that only one recess need be formed. On the other hand, if the panel is to have substantial width, many recesses should be formed.

Figure 4:
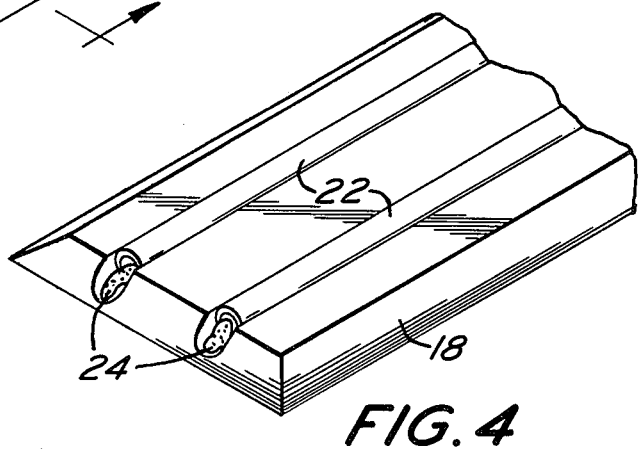
FIG. 4 is a perspective view of a portion of a partially completed panel prior to the application of foamed polymer.

As seen in FIG. 4, suitable elongated rigid tubular reinforcing means 22, such as low cost steel pipe, is inserted in each of the elongated recesses 20 slightly above the bottom of each of the recesses. The weight of the finished panels can be controlled by selecting reinforcing means of the desired weight.

The rigid tubular reinforcing means 22 may be secured in the recesses by a suitable adhesive 24. Preferably, only a small amount of adhesive should be used so that the foamed polymer has access to the space between the reinforcing means and the groove.

The reinforced substrate illustrated in FIG. 4 is then placed in a conventional mold of the type used for molding simulated wood panels. Typically, the interior surfaces of such molds have simulated wood grain formed therein, and may have scroll work or other desired ornamentation.

A foaming polymer, which preferably is a foaming thermosetting polymer such as polyurethane or polyester, is poured into the mold over the reinforced substrate and permitted to expand. While foaming thermosetting polymers are preferred, if desired, a foaming thermoplastic material, such as foam polystyrene may be used. As the foaming polymer expands, it assumes the configuration of the mold thereby achieving a wood grain finish and ornamental scroll work. The foaming of the polymer is achieved under conventional conditions, normally under pressure, and this technology is well known to those skilled in this art.

The expanding polymer fills the ends of the elongated hollow members 22 and the portions of the recesses 20 below the hollow members 22 to firmly embed them into the panel. The expanding foam enters into the reinforcing members 22 and is thereby anchored thereto.

After the molding step is completed, the newly created panel 10 has a foamed polymer coating 26. It can be covered with sealants to make it substantially impervious to moisture. Such sealants may comprise a conventional base coat of vinyl sealer or toner or lacquer. Additionally, a glaze such as an inorganic earth pigment and an outermost sealant such as a lacquer may also be applied. The sealants and finishes mentioned are just a few of many such materials which are commercially available and are well known to those skilled in the art.

The underside face 28 of the simulated wood panel is likewise covered by finishes and sealants to impede the penetration of moisture into the substrate 18. If desired, such face 28 may be made more attractive by embossing and wood grain printing thereon, as by the use of conventional apparatus, and then sealed.

Alternatively, foaming polymer may be molded on the face 28 so that the substrate 18 is entirely disposed within foam polymer. Some foam polymers do not need sealants, and are substantially impervious to water. Moreover, with some foam polymers, the entire polymer may be colored, avoiding the use of glazes.

The use of finishes and sealants substantially impedes the penetration of moisture into the panel. However, to the extent that such moisture does penetrate the panel, its distortion effects are substantially reduced by the rigidifying effects of the reinforcing means therein.

The simulated wood panels of the present invention possess great structural strength, and approximate the weight and appearance of wood. Due to the presence of the rigid tubular reinforcing means, warpage is avoided even when the sealant water barrier is disturbed or destroyed in places.

While the invention has been described by reference to one particular embodiment thereof, it is apparent that many other forms and embodiments will be obvious to those skilled in the art in view of the foregoing description. Thus, the scope of the claims should not be limited by that description but, rather, only by the scope of the claims appended hereto.

I claim:

1. A simulated wood panel which resists warpage and bending comprising a substrate formed of a water absorbing fibrous material, said substrate having at least one elongated groove on one surface thereof, a rigid elongated reinforcing means in said groove, a foamed polymer covering said surface of said substrate and anchoring said rigid elongated reinforcing means to said substrate, said polymer at least substantially surrounding said elongated reinforcing means and sealing said substrate against moisture. the outside surface of said foamed polymer having a simulated wood grain finish thereon.

2. A panel in accordance with claim 1 wherein said elongated reinforcing means comprises a tubular member.

3. A panel in accordance with claim 2 wherein said polymer fills at least the ends of said tubular member.

4. A panel in accordance with claim 1 wherein the foamed polymer is a thermosetting polymer.

5. A panel in accordance with claim 4 wherein said thermosetting polymer is selected from the group consisting of polyurethane and polyester.

6. A panel in accordance with claim 1 wherein said rigid elongated reinforcing means is adhesively secured within said groove.

7. A panel in accordance with claim 1 wherein said substrate is selected from the group consisting of flake board, fiber board, and cardboard.

* * * * *